United States Patent Office 3,530,068
Patented Sept. 22, 1970

3,530,068
PLASTIC ANTIFRICTION MATERIALS
Vasily Vladimirovich Korshak, Ulitsa Gubkina 4, kv. 81; Svetlana Vasilievna Vinogradova, Jugo-Zapad, kvartal 42a, korpus 1, kv. 35; Grigory Lvovich Slonimsky, Ulitsa Chkalova 1/4, kv. 16; Irina Alexandrovna Gribova, Ulitsa Vavilova 10, korpus 20, kv. 31; Alla Nikolaevna Chumaevskaya, Leninsky prospekt 101, korpus 163, kv. 86; Alexandr Petrovich Krasnov, Prospekt Kalinina 31, kv. 28; Zinaida Yakovlevna Fomina, 1 Yaroslavskaya ulitsa 23a, kv. 16; and Anri Alexandrovich Askadsky, Jugo-Zapad, kvartal 46–47, korpus 39, kv. 25, all of Moscow, U.S.S.R.
No Drawing. Filed June 2, 1967, Ser. No. 643,058
Int. Cl. C10m 7/06, 7/16, 7/44
U.S. Cl. 252—12                    7 Claims

ABSTRACT OF THE DISCLOSURE

Antifriction materials consisting of a polymer component comprising a polyarylate resin selected from the group consisting of isophthalic acid-methyl phosphonic acid-phenolphthalein resin and terephthalic acid-bis(carboxyphenyl) - methylphosphine oxide - phenolphthalein resin having less than 3% by weight of phosphorus and a filler component comprising powdered molybdenum disulfide and powdered copper or silver are prepared by stirring the components for 3–5 minutes in a mill and molding the resulting composition an an elevated temperature and pressure.

---

This invention relates to plastic antifriction materials. Antifriction materials find engineering applications in the fabrication of compression- or injection-molded elements to be used in dry-friction assemblies.

There are known antifriction materials derived from polyamide resins, phenol-formaldehyde resin, and fluoroplast filled with graphite, molybdenum disulfide, etc. (cf. Wear, 1962, 5, No. 2; Modern Plastics, 1963, 40, No. 5, and British Plastics, 1964, 37, No. 6).

When used in dry-function assemblies, the known antifriction materials have the disadvantage that the component polymers exhibit high autohesion in the range of temperatures that are much below their thermal stability, thereby causing the seizure or jamming of dry-friction assemblies.

Moreover, the use of some of the known antifriction materials in dry-friction assemblies requires the incorporation of fluid lubricants, since the frictional coefficient of said polymers is excessively high.

It is an object of the present invention to provide an antifriction material derived from polymers noted for their low autohesion characteristics over a wide temperature range so that jamming and seizure in dry-friction assemblies, in which said materials are employed, will be eliminated.

It is an other object of the present invention to provide an antifriction material which obviates the need to employ fluid lubricants in the friction assemblies.

In accordance with these and other objects, the antifriction materials of the present invention comprises a polymer component, viz., a polyarylate resin containing at least 3% by weight of phosphorus, and a filler, viz., powdered molybdenum disulfide.

It is expedient to incorporate metal powders into the filler for the purpose of enhancing the thermal conductivity of the antifriction materials and for improving its hardness and wear resistance, and finally for obtaining superior moldability of the product.

In addition to phosphorus-containing polyarylate resin, the present antifriction material may contain phosphorus-free polymers, the proportion of the polymer mixture components being selected so as to obtain antifriction materials containing not less than 0.03% by weight of phosphorus.

It is advantageous to employ antifriction material containing 10–30% by weight of polymers and 90–70% by weight of the filler. The above proportion of components provides a low frictional coefficient and high wear resistance for the antifriction material.

The present antifriction material can be prepared by the following procedure.

The components of the antifriction material, viz., a polyarylate resin containing at least 3% by weight of phosphorus, and a filler which comprises molybdenum disulfide powder of appropriate fineness, are subjected to mixing until a perfectly homogeneous mixture is obtained. The resultant molding composition is then compression-molded.

The filler component may further comprise metal powders. In such a case, the procedure employed for preparing the molding composition of the antifriction material is analogous to that described above.

In preparing the present antifriction material, in addition to a phosphorus-containing polyarylate, recourse may be had to a mixture of said polyarylate with phosphorus-free thermosetting or thermoplastic resins.

To prepare molding compositions containing a mixture of polymers, use is made of the above procedure, the proportion of the polymers comprising the mixture being selected so that the finished antifriction material will contain not less than 0.03% by weight of phosphorus.

For a better understanding of the invention, the following examples for preparing the present antifriction material are presented by way of illustration.

EXAMPLE 1

Into a vibrating mill are charged 4.0 g. of polyarylate resin derived from isophthalic acid, methyl phosphonic acid and phenolphthalein, 6 g. of molybdenum disulfide, and 4.0 g. of powdered metallic copper. The mixture is stirred for a period of 3–5 minutes, and the molding composition thus obtained is subjected to compression-molding at a temperature of 220–250° C. and a specific pressure of 1,000–1,500 kg./cm.$^2$.

EXAMPLE 2

Into a vibrating mill are charged 4.0 g. of polyarylate resin derived from terephthalic acid, bis-(carboxyphenyl)-methylphosphine oxide, and phenolphthalein, 6 g. of molybdenum disulfide, and 4.0 g. of powdered metallic silver. Mixing is continued for a period of 3–5 minutes, and the molding composition thus obtained is subjected to compression molding at a temperature of 300–320° C. and and a specific pressure of 1,000–1,200 kg./cm.$^2$.

EXAMPLE 3

Into a vibrating mill are charged 2.0 g. of polyarylate resin derived from isophthalic acid, methyl phosphonic acid, and phenolphthalein, 2.0 g. of polyarylate resin derived from isophthalic acid and phenolphthalein, 6 g. of molybdenum disulfide, and 4 g. of powdered metallic copper. The mixture is stirred for a period of 3–5 minutes. The molding composition thus prepared is subjected to compression molding at a temperature of 300° C. and a specific pressure of 1,200 kg./cm.$^2$.

EXAMPLE 4

Into a vibrating mill are charged 2.5 g. of polyarylate resin derived from isophthalic acid, methyl phosphonic acid and phenolphthalein, 2.5 g. of polyarylate resin derived from terephthalic acid and phenolphthalein, 11.0 g. of molybdenum disulfide, and 4.0 g. of powdered metallic copper. The mixture is then stirred for a period of 3–5 minutes.

The molding composition thus prepared is compression-molded at a temperature of 300–320° C. and a specific pressure of 1,000 kg./cm.²

EXAMPLE 5

Into a vibrating mill are charged 1.2 g. of polyarylate resin derived from isophthalic acid, methyl phosphonic acid and phenolphthalein, 3.6 g. of phenolphthalein-formaldehyde resin, 18.9 g. of molybdenum disulfide, and 7.5 g. of powdered metallic copper. The mixture is then stirred for a period of 1.5–2 minutes. The molding composition thus obtained is subjected to compression molding at a temperature of 200° C.

EXAMPLE 6

Into a vibrating mill are charged 1.2 g. of polyarylate resin derived from terephtalic acid, bis-(carboxyphenyl)-methylphosphine oxide and phenolphthalein, 3.6 g. of phenolphthalein-formaldehyde resin, 18.9 g. of molybdenum disulfide, and 7.5 g. of powdered metallic silver.

Mixing and processing are carried out by following the procedure disclosed in Example 5.

Although the present invention has been described with reference to specific embodiments thereof, it will be readily understood by those skilled in the art that various changes and modifications may be resorted to without deviating from the spirit and scope of the invention.

These changes and modifications are to be considered as falling within the spirit and scope of the invention as defined in the appended claims.

We claim:

1. An antifriction material consisting of a polymer component consisting of a polyarylate resin selected from the group consisting of isophthalic acid-methyl phosphonic acid-phenolphthalein resin and terephthalic acid-bis(carboxyphenyl)-methylphosphine oxide-phenolphthalein resin having a phosphorus content of at least 3% by weight, and a filler component consisting of powdered molybdenum disulfide and a powder of a thermally conductive metal.

2. An antifriction material according to claim 1 wherein the polymer component further contains a phosphorus-free polymer selected from the group consisting of phenolphthalein-formaldehyde resin, isophthalic acid - phenolphthalein resin, and terephthalic acid-phenolphthalein resin.

3. An antifriction material according to claim 2 wherein the polyarylate resin having a phosphorus content of at least 3% by weight and the phosphorus-free polymer are present in amounts such that the total phosphorus content is at least 0.03% by weight based on the total weight of the antifriction material.

4. An antifriction material according to claim 1 wherein the polymer component comprises 10–30% by weight and the filler component comprises 90–70% by weight.

5. An antifriction material according to claim 2 wherein the polymer component comprises 10–30% by weight and the filler component comprises 90–70% by weight.

6. An antifriction material according to claim 3 wherein the polymer component comprises 10–30% by weight and the filler component comprises 90–70% by weight.

7. An antifriction material according to claim 1 wherein the powder of a thermally conductive metal is powdered copper or powdered silver.

References Cited

UNITED STATES PATENTS

| | | | |
|---|---|---|---|
| 2,465,051 | 3/1949 | Adams et al. | 252—12 |
| 3,014,865 | 12/1961 | Seniff et al. | 252—12 |

DANIEL E. WYMAN, Primary Examiner

I. VAUGHN, Assistant Examiner